United States Patent [19]
Curtis et al.

[11] Patent Number: 4,969,847
[45] Date of Patent: Nov. 13, 1990

[54] THROUGH-COWL STRAIN RELIEF ASSEMBLY FOR OUTBOARD MOTOR

[75] Inventors: Mark D. Curtis, Oshkosh; David W. Heidel, Green Lake, both of Wis.

[73] Assignee: Brunswick Corporation, Skokie, Ill.

[21] Appl. No.: 387,855

[22] Filed: Jul. 31, 1989

[51] Int. Cl.$^5$ ............................................. B63H 21/24
[52] U.S. Cl. .................................. 440/77; 248/68.001; 248/68.1; 123/195 P; 285/192
[58] Field of Search ...................... 440/76, 77, 88, 900, 440/84–87; 285/137.1, 192; 248/68.1, 74.4; 123/195 P, 468, 469

[56] References Cited

U.S. PATENT DOCUMENTS

| | | | |
|---|---|---|---|
| 3,742,119 | 6/1973 | Newman | 248/68.1 |
| 4,375,356 | 3/1983 | Stevens | 440/900 |
| 4,671,773 | 6/1987 | Friedle et al. | 440/88 |

FOREIGN PATENT DOCUMENTS 58-105896  6/1983  Japan ...................................... 440/77

*Primary Examiner*—Sherman Basinger
*Assistant Examiner*—Edwin L. Swinehart
*Attorney, Agent, or Firm*—Andrus, Sceales, Starke & Sawall

[57] ABSTRACT

A strain relief assembly for an outboard motor for relieving strain on wires, cables, lines or the like which extend between the boat and the cowl assembly which encloses the power head of the outboard motor. The stain relief assembly is preferably disposed within an opening formed in one of the cowl sections, and comprises a two-piece member. The two-piece member includes a series of indentations which cooperate to clamp the wires, cables, lines or the like therebetween when screwed together. With the strain relief assembly fixed to the wall of the cowl section forming the opening, this acts to maintain the wires, cables or lines in position relative to the cowl section for relieving strain thereon during movement of the outboard motor. A fuel line strain relief assembly is also provided, comprising a stem fixed to the two-piece member. An external fuel line supplies fuel to the stem, which is communicated therethrough to an internal fuel line extending between the stem and the power head.

3 Claims, 2 Drawing Sheets

U.S. Patent  Nov. 13, 1990  Sheet 1 of 2  4,969,847
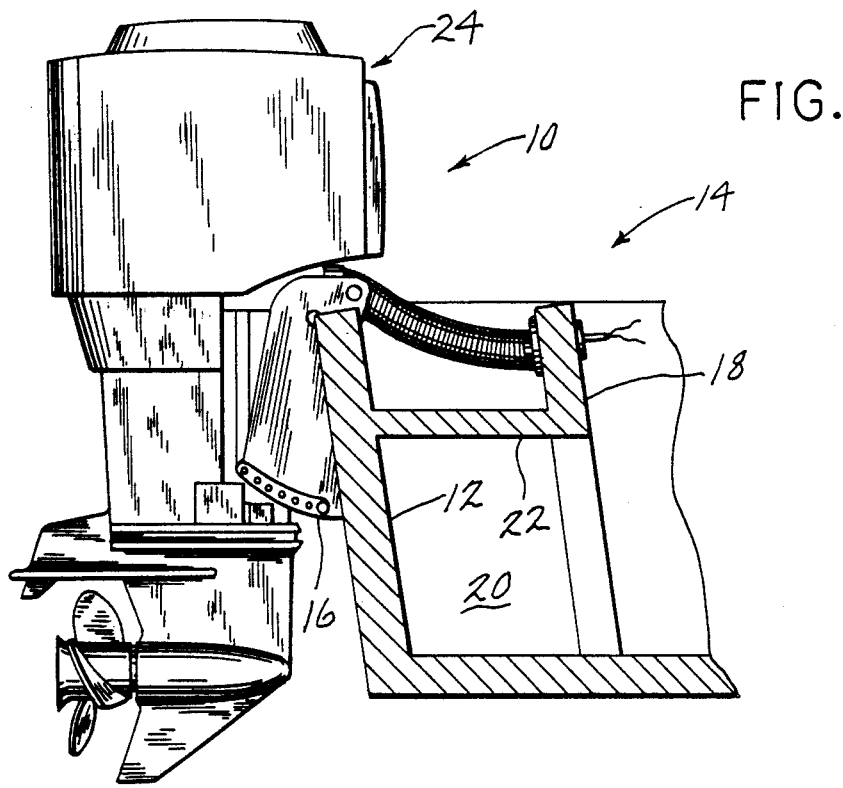
FIG. 1
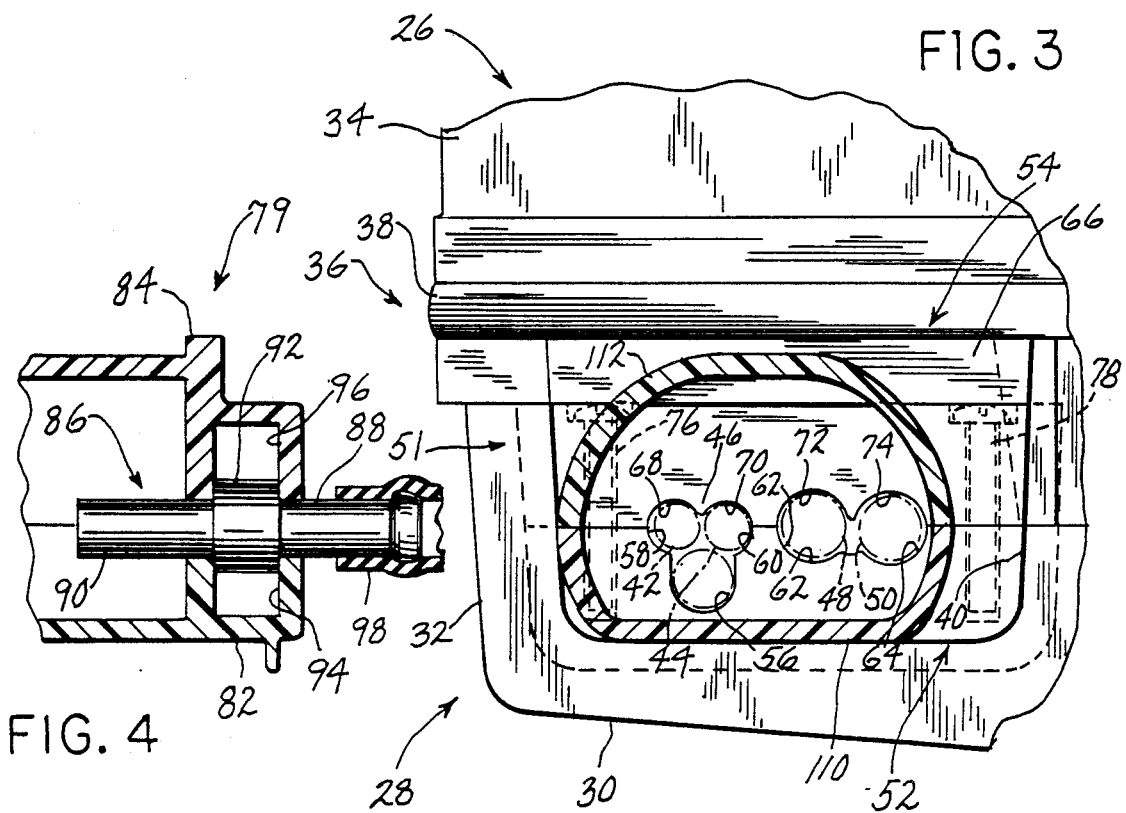
FIG. 3
FIG. 4

4,969,847

THROUGH-COWL STRAIN RELIEF ASSEMBLY FOR OUTBOARD MOTOR

BACKGROUND AND SUMMARY

This invention relates to an outboard motor for use in a marine propulsion system, and more particularly to an assembly for relieving strain on the fuel line, wires, or cables which pass through the cowl assembly enclosing the power head of the outboard motor.

In an outboard motor for mounting to the transom of a boat, it is typically the case that various wires, cables, or the like extend between the boat and the outboard motor, and terminate in the interior of a cowl assembly which encloses the power head of the outboard motor. In most applications, positive and negative battery cables run between a battery housed within the boat and terminals provided on the power head. An engine harness typically extends between the power head and the remote control, which is mounted at the driver's area within the boat. In some applications, a remote oil tank is provided within the boat, and oil lines extend between the boat and the power head. Additionally, a water pressure gauge line may be provided between a water pressure gauge and the power head. A fuel line supplies fuel to the power head from a fuel tank housed within the boat. Finally, throttle and shift cables extend between the boat and the power head.

During movement of the power head, such as steering or tilting, the above-described wires, cable and lines often experience strain resulting from contact between the wire, cable or line and the wall of the opening in the cowl assembly through which the wire, cable or line extends. Such strain is detrimental, and may ultimately result in failure of the wire, cable or line upon continued such movement of the outboard motor.

The present invention is intended to relieve strain on wires, cables, or lines which extend into the interior of an outboard motor cowl assembly during movement thereof. The cowl assembly is preferably formed from a pair of cowl sections which fit together to enclose the outboard motor power head. A joint is formed between the cowl sections when they are fit together. In accordance with the invention, a strain relief assembly comprises a first member and a second member, both of which are adapted for placement within an opening formed in one of the cowl sections. In a preferred embodiment, the opening in the cowl section preferably opens onto the joint between the cowl sections when assembled. Means for receiving and supporting one or more wires or cables is provided on a surface of one of the first or second members, and means for positively engaging the one or more wires or cables is provided on a surface of the other of the members. The first and second members are adapted to be fit together so that the positive engagement means and the receiving and supporting means are located closely adjacent outer surfaces of the one or more wires or cables. Means is provided for drawing the first and second members together, so that the positive engagement means and the receiving and supporting means cooperate to clamp the one or more wires or cables therebetween. With the first and second members connected to the cowl section within which the opening is provided, this assembly thus fixes the position of the one or more wires or cables relative thereto. In this manner, strain on such wires or cable is relieved during movement of the outboard motor. In a preferred embodiment, with the opening provided in the cowl section at the joint formed therebetween when the cowl sections are assembled, the assembly formed by the first and second members forms a part of the joint between the cowl sections. The receiving and supporting means, as well as the positive engagement means, preferably comprises an indentation formed in facing surfaces of the first and second members. The indentations preferably cooperate to substantially surround the one or more wires or cables when the first and second members are drawn together. In a preferred embodiment, the means for drawing the first and second members together comprises a threaded connector extending through one of the first and second members and into the other. The wall of the cowl section forming the opening within which the first and second members are placed is preferably provided with a groove, and a projection is provided on the first and second members for mating with the groove in order to maintain the assembly in position on the cowl section.

The invention also contemplates an assembly for accommodating passage of a fuel line into the interior of the cowl assembly. According to this aspect of the invention, a stem is adapted for mounting to one of the cowl sections, and includes an inner portion extending into the interior of the cowl assembly and an outer portion extending outwardly from the cowl assembly. The inner portion of the stem is adapted to receive an end of an internal fuel line, and the outer portion is adapted to receive an end of an external fuel line leading from the fuel tank. Means is provided for maintaining the position of the stem relative to the cowl section to which it is mounted. In a preferred embodiment, the stem is fixed to the cowl section by means of a two-piece member as described above. The two-piece member includes a first member having a recess for accommodating passage of the stem therethrough, and a second member formed likewise. The first and second members, when fit together, allow passage of the stem therethrough. The means for maintaining the stem in position preferably comprises an enlarged portion formed on the stem, which is adapted to be received within recessed areas associated with the recesses which accommodate passage of the stem through the two-piece member. The enlarged portion of the stem and the recessed areas cooperate to prevent longitudinal movement of the stem after the first and second members have been fit together.

The invention finally contemplates a combination of the above-described components.

BRIEF DESCRIPTION OF THE DRAWINGS

The drawings illustrate the best mode presently contemplated of carrying out the invention.

In the drawings:

FIG. 1 is an elevation view of an outboard motor as mounted to the transom of a boat, a portion of which is shown in section;

FIG. 3 is a partial sectional view taken generally along line 3—3 of FIG. 2; and FIG. 4 is a partial sectional view taken generally along line 4—4 of FIG. 2.

DETAILED DESCRIPTION OF THE PREFERRED EMBODIMENT

Figure 2:
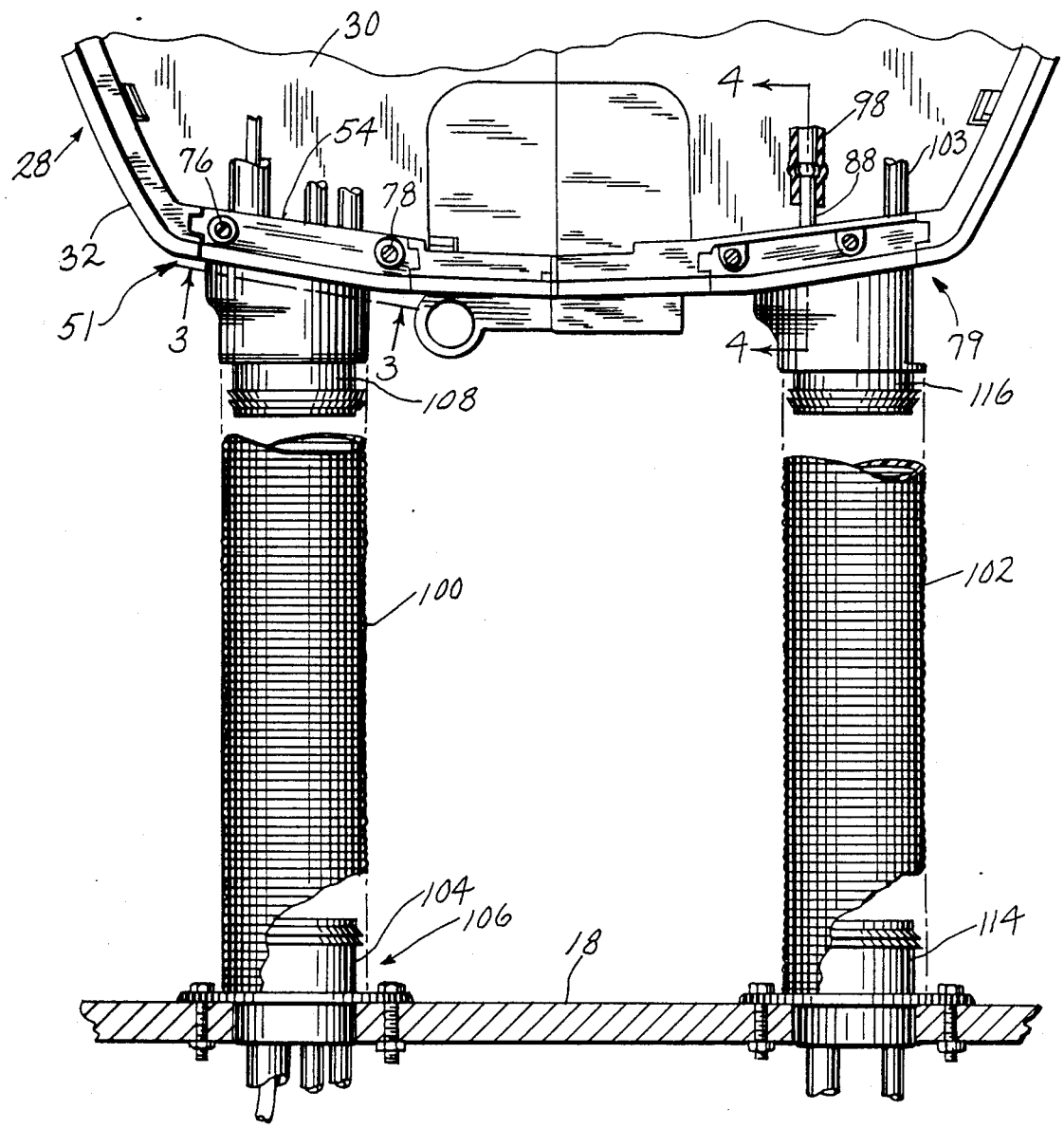
FIG. 2 is a plan view showing the invention, with the upper cowl section removed.

With reference to FIG. 1, an outboard motor 10 is adapted for mounting to the transom 12 of a boat 14 in a conventional manner, as shown. A transom bracket 16 is provided for mounting motor 10 to the transom 12. Boat 14 includes a false transom 18, and a compartment 20 is formed below an upper wall 22 extending between transom 12 and false transom 18. As in known, compartment 20 may be used for storage of a battery, as well as one or more fuel tanks.

Outboard motor 10 includes a power head (not shown), which is enclosed by a cowl assembly 24. As shown in FIG. 3, cowl assembly 24 includes an upper cowl section, shown generally at 26, and a lower cowl section, shown generally at 28. Lower cowl section 28 comprises a pan including a lower wall 30 and an upstanding wall 32. Upper cowl section 26 comprises a bucket having an upper wall and a depending side wall, shown at 34. Upper cowl section 26 and lower cowl section 28 are adapted to fit together so as to form a joint, shown at 36, therebetween. A seal strip 38 is provided at joint 36 for preventing entry of water into the interior of cowl assembly 24 through joint 36.

As best shown in FIG. 3, upstanding wall 32 of lower cowl section 28 is provided with an opening 40, which opens onto the upper edge of upstanding wall 32. Opening 40 is adapted to accommodate passage of a series of wires and cables therethrough. As shown, a pair of battery cables 42, 44 and an engine harness 46 pass through opening 40, as do a pair of lines 48, 50 connected to a remote oil tank.

As a means-for relieving stress on cables 42, 44, harness 46, and lines 48, 50 at point of entry into the interior of cowl assembly 24, a strain relief assembly 51, including a lower member 52 and an upper member 54, is adapted for placement within lower cowl section opening 40. Lower member 52 is adapted for mounting within opening 40 by means of a projection which extends into a groove provided in the wall of lower cowl section 32 which forms opening 40. Referring to FIG. 3, this groove is represented by dashed lines.

As shown, lower member 52 occupies only partially the full height of opening 40.

Lower member 52 is provided with a series of indentations, such as shown at 56, 58 and 60. Indentation 56 is adapted to receive and support engine harness 46, while indentations 58, 60 receive and support battery cable 42, 44. In a like manner, indentations 62, 64 receive and support oil lines 48, 50.

Upper member 54 occupies the remainder of the height of opening 40, and also includes projections which extend sideways into the groove provided in the wall of lower section 32 which forms opening 40. Upper member 54 includes a lip 66 which is coextensive with the upper edge of upstanding wall 32.

In a manner similar to lower member 52, upper member 54 is provided with a series of indentations shown at 68, 70, 72 and 74. Indentations 68, 70 are adapted to positively engage the upper surface of battery cables 42, 44, and indentations 72, 74 are adapted to positively engage the upper surface of oil lines 48, 50.

In lower member 52, indentations 56–64 form a part of an upwardly facing surface. Likewise, in upper member 54, indentations 68–74 form a part of a downwardly facing surface. Lower member 52 and upper member 54 are adapted to be fit together so that the upwardly facing surface of lower member 52 and the downwardly facing surface of upper member 54 are positioned against each other. When in this position, as is shown in FIG. 3, the indentations provided in each such surface cooperate to substantially surround and receive cables 42, 44, harness 56 and lines 48, 50.

As a means for securing upper member 54 to lower member 52, a pair of threaded connectors, such as screws 76, 78, extend through upper member 54 and into lower member 52. When screws 76, 78 are turned down, upper member 54 and lower member 52 are drawn together so that cable 42, 44, harness 46 and lines 48, 50 are "sandwiched" therebetween. The surfaces of indentations 68, 70 are drawn downwardly into contact with the outer surface of cables 42, 44 so as to squeeze cables 42, 44 against the surfaces of indentations 58, 60 and harness 46. Harness 46 is thus squeezed against the surface of indentation 56, and the position of the entire package of cable 42, 44 and harness 46 is fixed relative to lower cowl section 32. In a like manner, oil lines 48, 50 are squeezed between the surfaces of indentations 62, 72 and 64, 74, respectively, so as to fix the position of lines 48, 50 relative to lower cowl section 32.

With reference to FIG. 2, it is seen that a second strain relief assembly, shown at 79, is provided on the other side of lower cowl section 28 from strain relief assembly 51. Structurally, strain relief assembly 79 is substantially similar to strain relief assembly 51 described above. However, rightward strain relief assembly 79 differs from assembly 51 in that it accommodates passage of a fuel line therethrough, and reference is made to FIG. 4 for a description of this feature.

Referring to FIG. 4, rightward strain relief assembly 79 includes a lower member 82 and an upper member 84. Lower member 82 and upper member 84 are adapted to fit together in a manner substantially identical to that described above with reference to lower member 52 and upper member 54 of leftward strain relief assembly 51. As shown, however, a stem 86 is adapted for mounting to strain relief assembly 79. Stem 86 includes an inner portion 88 extending into the interior of cowl assembly 24, and an outer portion 90 extending outwardly therefrom. A central portion of stem 86, shown at 92, is provided with an enlarged diameter relative to inner and outer portions 88, 90. Enlarged portion 92 is adapted to be received within recessed areas 94, 96 provided in lower member 82 and upper member 84, respectively. As shown, the longitudinal dimension of enlarged portion 92 is substantially equal to the dimension of recessed areas 94, 96 so that longitudinal movement of stem 86 is thereby prevented when lower member 82 and upper member 84 are fit together. In this manner, when lower member 82 and upper member 84 are mounted within the opening in lower cowl section upstanding wall 32, the position of stem 86 relative to lower cowl section 28 is fixed.

An internal fuel line 98 is adapted for connection to inner portion 88 of stem 86, and an external fuel line (not shown) is adapted for mounting to outer portion 90 of stem 86. With this construction, stem 86 accommodates passage of fuel through lower cowl section 28, and the presence of stem 86 eliminates any strain which may be experienced by the fuel line during movement of outboard motor 10.

With reference to FIG. 2, a pair of flexible tubes 100, 102 are provided between the exterior of lower cowl section 28 and false transom 18. Tube 100 encloses battery cables 42, 44, harness 46 and oil lines 48 extending between outboard motor 10 and transom 18. Likewise, tube 102 encloses the fuel line and throttle and shift cables, shown at 103.

The forward end of tube 100 is connectable to a fitting 104 extending rearwardly from a through-hull assembly 106 connected to false transom 18. Likewise, the rearward end of tube 100 is connectable to a fitting 108. Fitting 108 is formed by lower and upper fitting halves, shown at 110, 112, formed on lower and upper members 52, 54, respectively, of strain relief assembly 51. Tube 102 is connected to a forward fitting 114 and a rear fitting 116 in a similar manner.

Various alternatives and modifications are contemplated as being within the scope of the following claims particularly pointing out and distinctly claiming the subject matter regarded as the invention.

I claim:

1. For an outboard motor including a power head and first and second cowl sections which form a cowl assembly when fit together for enclosing said power head, said cowl assembly including a joint formed between said cowl sections, wherein an opening is formed in one of said cowl sections at said joint, as assembly for accommodating passage of a fuel line into the interior of said cowl assembly, comprising:
   a stem mounted to the cowl section in which said opening is formed, said stem including an inner portion extending into the interior of said cowl assembly and an outer portion extending outwardly from said cowl assembly, wherein one end of an external line is connectable to the outer portion of said stem, and one end of an internal line is connectable to the inner portion of said stem;
   means for maintaining said stem in position relative to said cowl section; and
   means engageable with said cowl section at said opening for mounting said stem to said cowl section at said opening, comprising a two-piece member securable to said cowl section at said opening, wherein each piece of said two-piece member is provided with an indentation accommodating passage of said stem therethrough when said two-piece member is in place within said opening.

2. The assembly of claim 1, wherein said means for maintaining said stem in position comprises a portion of enlarged transverse dimension provided on said stem, and wherein the indentations in each piece of said two-piece member include a recessed area for receiving said enlarged portion of said stem when said two-piece member is in place within said opening.

3. For an outboard motor including a power head and first and second cowl sections which form a cowl assembly when fit together for enclosing said power head, sections, an assembly for accommodating passage of one or more cables and a fuel line into the interior of said cowl assembly, comprising:
   a first member adapted for placement within an opening formed in one of said cowl sections;
   a second member adapted for placement within said opening;
   means formed in a surface of one of said members for receiving and supporting said one or more cables;
   means formed in a surface of the other of said members for positively engaging said one or more cables;
   said first and second members being adapted to fit together such that said surfaces face each other, and said receiving and supporting means and said positive engagement means are located closely adjacent outer surfaces of said one or more cables;
   a stem adapted for placement between said first and second members, said stem including an inner portion extending into the interior of said cowl assembly and an outer portion extending outwardly from said cowl assembly, wherein one end of an external fuel line is connectable to the outer portion of said stem, and one end of an internal fuel line is connectable to the inner portion of said stem;
   means for maintaining said stem in position relative to said first and second members when said first and second members are fit together; and
   means for drawing said first and second members together, so that said one or more cables are sandwiched between said receiving and supporting means and said positive engagement means for fixing the position of one or more cables at the point of entry into said cowl assembly and thereby relieving strain on said one or more cables during movement of said outboard motor.

* * * * *

UNITED STATES PATENT AND TRADEMARK OFFICE
CERTIFICATE OF CORRECTION

PATENT NO. : 4,969,847
DATED : November 13, 1990
INVENTOR(S) : Mark D. Curtis and David W. Heidel It is certified that error appears in the above-identified patent and that said Letters Patent is hereby corrected as shown below:

Claim 3, Col. 6, Line 8:

After "power head," insert -- said cowl assembly including a joint formed between said cowl --.

Signed and Sealed this

Twenty-first Day of April, 1992

Attest:

HARRY F. MANBECK, JR.

*Attesting Officer*      *Commissioner of Patents and Trademarks*